(12) United States Patent
Lee

(10) Patent No.: US 6,543,947 B2
(45) Date of Patent: Apr. 8, 2003

(54) KEYBOARD HAVING KEYS ARRANGED IN A PAN CONFIGURATION

(76) Inventor: José H. Lee, 10369 167th Street, Surrey, B.C. (CA), V4N 1Z2

(*) Notice: Subject to any disclaimer, the term of this patent is extended or adjusted under 35 U.S.C. 154(b) by 26 days.

(21) Appl. No.: 09/805,058

(22) Filed: Mar. 14, 2001

(65) Prior Publication Data

US 2002/0168209 A1 Nov. 14, 2002

(51) Int. Cl.[7] .............................................. H03K 17/94
(52) U.S. Cl. ........................ 400/489; 400/488; 341/22
(58) Field of Search ................................ 400/488, 472, 400/88, 89, 100, 489; 341/21, 22, 23; 345/168; 361/680; D14/391, 341

(56) References Cited

U.S. PATENT DOCUMENTS

| | | | |
|---|---|---|---|
| 4,846,598 A | 7/1989 | Livits | 400/472 |
| 4,911,565 A | 3/1990 | Ryan | 400/100 |
| 4,971,465 A | 11/1990 | Hashimoto | 400/485 |
| 5,059,048 A | 10/1991 | Sirkin | 400/486 |
| 5,128,672 A * | 7/1992 | Kaehler | 341/23 |
| 5,197,811 A | 3/1993 | Levinrad | 400/489 |
| 5,288,158 A | 2/1994 | Matias | 400/472 |
| 5,336,002 A | 8/1994 | Russo | 400/489 |
| 5,391,006 A * | 2/1995 | Danziger | 400/488 |
| 5,469,160 A * | 11/1995 | Yang | 341/20 |
| 5,481,263 A * | 1/1996 | Choi | 341/20 |
| 5,500,643 A | 3/1996 | Grant | 341/22 |
| 5,576,706 A * | 11/1996 | Daigle et al. | 341/20 |
| 5,583,497 A * | 12/1996 | Hankes | 341/22 |
| 5,880,685 A * | 3/1999 | Weeks | 200/339 |
| 6,005,496 A | 12/1999 | Hargreaves et al. | 341/22 |
| 6,183,149 B1 * | 2/2001 | Caplan | 400/488 |
| D449,611 S * | 10/2001 | Kendall | D14/391 |
| 6,370,018 B1 * | 4/2002 | Miller et al. | 345/169 |

* cited by examiner

Primary Examiner—John S. Hilten
Assistant Examiner—Dave A. Ghatt
(74) Attorney, Agent, or Firm—Oyen Wiggs Green & Mutala (57) ABSTRACT

A keyboard has an array of central keys positioned in a generally planar configuration and an array of inwardly-angled keys positioned around and angled toward the central keys to define a pan-like configuration. The keyboard may also comprise an array of outside keys positioned around the inwardly-angled keys. The keyboard may have one or more outwardly angled keys positioned around and angled away from the central keys. The outwardly angled keys are adapted to be accessible by a user's thumb, little finger or side of a hand. A keyboard, adapted for use with one hand, comprise four rows of five central keys forming a rectangular outer boundary. Two columns and two rows of 5 inwardly-angled keys surround the central keys. The character-key allocation of the pan-shaped keyboard adapted for use with one hand comprises the re-arrangement of the 3 main rows of 10 keys of a standard keyboard standard. The configuration permits a user to locate his or her hands on the home keys readily, without visual aid by feeling the raised edges of the inwardly-angled keys.

23 Claims, 10 Drawing Sheets

| | PSCR | F10 | F11 | F12 | | |
|---|---|---|---|---|---|---|
| | SYS RQ | F7 | F8 | F9 | | |
| TAB | SC LCK | F4 | F5 | F6 | | BSP |
| INS | PAUSE | F1 | F2 | F3 | | |
| DEL | BREAK | | ↑ | | | |
| | Win | ← | ↓ | → | Men | |

| | : ; | Q | J | K | X | |
|---|---|---|---|---|---|---|
| ~ | " ' | < , | > . | P | Y | _ - |
| TAB | A | O | E | U | I | BSP |
| INS | F | G | C | R | L | \| \ |
| DEL | D | H | T | N | S | ? / |
| | B | M | W | V | Z | |

KEYBOARD HAVING KEYS ARRANGED IN A PAN CONFIGURATION

FIELD OF THE INVENTION

This invention relates to manually activated data entry keyboards. The invention has particular application to keyboards adapted for one-handed operation.

BACKGROUND

In nearly every sector of the economy, data entry systems play a central role. Manually operated keyboards remain the most common data entry device. The basic keyboard design has an array of keys positioned linearly side by side. Top faces of the keys usually lie in a generally planar configuration. In an alphanumeric keyboard, alphabetical keys are usually located in three rows positioned in the centre of the array. Numerical, function and punctuation keys are distributed around the alphabetical keys.

The current basic standard, for the locations of specific keys, is the Qwerty two-handed keyboard, which was developed by C. L. Sholes around 1872. The appellation refers to the fact that such keyboards contain the letters Q-W-E-R-T-Y, beginning at the upper left end of the first row of alphabetical keys. In the standard Qwerty keyboard, a typist rests his or her fingers on well-defined keys on the central-"Home Row" which is the second row of alphabetical keys. More specifically, a typist rests the fingers of his or her left hand on the letters A, S, D and F and the first three fingers of his or her right hand (i.e. excluding th little finger) resting on the letters J, K and L. The letters F and J, on which each index finger rests, are the main home keys. Typical computer keyboards provide small protrusions on these keys so that they can be identified by a user by feel. Although Qwerty is the most common keyboard layout design currently in use, other keyboard layouts, such as the Dvorak keyboard (named after its inventor), exist. The majority of these keyboard layouts are designed for two-handed operators. Two-handed keyboards are well-known in the art.

There is a need for one-handed keyboards. Such keyboards are particularly useful for individuals who only have the use of one hand or individuals in occupations in which only one hand is free or is convenient for data entry. Further, two-handed keyboards tend to be undesirably bulky and cumbersome for some applications. Various one-handed keyboard designs having special character/key allocations and/or having special configurations of keys are known.

Because one-handed keyboards usually have a reduced number of keys compared to standard two-handed keyboard designs, some prior art keyboards, such as the one taught by Stone et al. U.S. Pat. No. 4,555,193), require that two or more keys be depressed to generate each character required. Other prior art keyboards, such as the keyboard taught by Matias (U.S. Pat. No. 5,288,158), are modifications of a character/key allocation standard (i.e. Qwerty or Dvorak), while others, such as the keyboard taught by Russo (U.S. Pat. No. 5,336,002) teach their own particular character/key allocation.

Some prior art keyboards teach alternatives to the linear side-by-side configuration of keys. An example is found in Levinrad et al. (U.S. Pat. No. 5,197,811), which teaches the use of vertical and horizontal strips of multifunction keys arranged in a user-friendly way. Another example is found in the keyboard taught by Sirkin (U.S. Pat. No. 5,059,048), where keys are positioned along curvilinear rows. Other keyboards provide alternatives to the generally planar configuration of the keys. An example is found in the rocking keyboard taught by Livits (U.S. Pat. No. 4,846,598).

Despite the wide variety of available keyboard devices, there remains a need for a keyboard which can be comfortably and efficiently operated with one hand. There is a particular need for a one-handed keyboard having a special configuration of keys which is compact and easy to use. There is also a need for such keyboards which have a character/key allocation that is intuitive for users already familiar with a known standard keyboard.

SUMMARY OF THE INVENTION

This invention provides manually-activated keyboards comprising an array of central keys in a generally planar configuration and a plurality of inwardly angled keys positioned around and angled toward the central keys. The central keys and inwardly-angled keys define a pan-like configuration.

The inwardly-angled keys may be positioned in generally linear rows and columns.

An array of outside keys may be positioned outside of the inwardly-angled keys in a generally planar configuration.

An outwardly angled key may be positioned peripherally adjacent to the central keys, the outwardly angled key angling away from the central keys. The outwardly angled key is located in a position easily accessible by a user's thumb, little finger or the side of a user's hand. The outwardly angled key is typically positioned radially outward a distance between 2 inches and 4 inches from a middle finger home key, the middle finger home key being the key where a user's middle finger naturally rests during operation. In a preferred embodiment, the outwardly angled key is positioned at an intersection of one of the rows of inwardly-angled keys with one of the columns of inwardly-angled keys.

This invention provides keyboards capable of being connected with one another to form a single logical input device to an electronic apparatus, such as a computer. Alternative embodiments of forming a single logical input device comprise keyboards connected directly to the electronic apparatus and keyboards connected to one another, with one keyboard connected to the electronic apparatus.

A keyboard according to the preferred embodiment of this invention can be used with one hand. The keyboard comprises four rows and five columns of central keys, with:
  a) an inwardly-angled key positioned at each end of each row of central keys to form two columns of inwardly-angled keys, and
  b) an inwardly-angled key positioned at each end of each column of central keys to form two rows of inwardly-angled keys.

The preferred embodiment provides a key allocation scheme as follows:
  a) the first row of central keys is assigned the letters "Q", "W", "E", "R" and "T" of the English alphabet;
  b) the second row of central keys is assigned the letters "A", "S", "D", "F" and "G" of the English alphabet;
  c) the third row of central keys is assigned the letters "Y", "U", "I", "O" and "P" of the English alphabet;
  d) the fourth row of central keys is assigned the letters "H", "J", "K" and "L" of the English alphabet and the character ";" or
  e) the top row of inwardly-angled keys is assigned the letters "Z", "X", "C", "V" and "B" of the English alphabet; and f) the bottom row of inwardly-angled keys is assigned the letters "N" and "M" of the English alphabet and the characters "," or "<", "." or ">" and "/" or "?".

The columns of inwardly-angled keys are assigned characters or functions from a group consisting of:
a) characters "`", "~", "-", "_", "\", "|", "'" and """; and
b) functions "Tab", "Insert", "Delete" and "Back Space".

The outside keys are assigned functions selected from a group consisting of "Home", "Esc", "End", "Alt", "Ctrl", "Page Up", "Page Down", "←" (left arrow), "→" (right arrow), "↓" (down arrow), "↑" (up arrow), "Shift", "Num", "PC" and "Md". A "PC" key activates an alternative character/key allocation scheme. An "Md" key is a function key which activates a manufacturer definable mode.

The outwardly angled key is assigned a function selected from the group consisting of "Space" and "Enter".

The preferred embodiment further comprises a toggling key, wherein engaging the toggling key causes the functions, assigned to the outside keys, to toggle between two or more alternative key allocation schemes.

Preferably, where two preferred embodiment one-hand keyboards are either connected to one another, or connected to an electronic apparatus, so as to form a single logical input device, the preferred key allocation scheme is as follows:
a) the first row of central keys of the first keyboard is assigned the characters "1" or "!", "2" or "@", "3" or "#", "4" or "$" and "5" or "%";
b) the second row of central keys of the first keyboard is assigned the letters "Q", "W", "E", "R" and "T" of the English alphabet;
c) the third row of central keys of the first keyboard is assigned the letters "A", "S", "D", "F" and "G" of the English alphabet
d) the fourth row of central keys of the first keyboard is assigned the letters "Z", "X", "C", "V" and "B' of the English alphabet
e) the first row of central keys of the second keyboard is assigned the characters "6" or "^", "7" or "&", "8" or "*", "9" or "(and "0" or ")";
f) the second row of central keys of the second keyboard is assigned the letters "Y", "U", "I", "O" and "P" of the English alphabet;
g) the third row of central keys of the second keyboard is assigned the letters "H", "J", "K" and "L" of the English alphabet and the character ";" or ":"; and
h) the fourth row of central keys of the second keyboard is assigned the letters "N" and "M" of the English alphabet and the characters "," or "<", "." or ">" and "/" or "?".

This invention also provides a method for assigning letters, characters or functions found in 3 rows of 10 keys of a standard keyboard comprising, to the keys of an alternate keyboard having 4 primary rows of 5 keys and 2 secondary rows of 5 keys. The key allocation scheme is as follows:
a) assigning letters, characters or functions found in one set of 5 keys of the first row of the standard keyboard to the first primary row of 5 keys of the alternate keyboard;
b) assigning letters, characters or functions found in one set of 5 keys of the second row of the standard keyboard to the second primary row of 5 keys of the alternate keyboard;
c) assigning letters, characters or functions found in the other set of 5 keys of the first row of the standard keyboard to the third primary row of 5 keys of the alternate keyboard;
d) assigning letters, characters or functions found in the other set of 5 keys of the second row of the standard keyboard to the fourth primary row of 5 keys of the alternate keyboard
e) assigning letters, characters or functions found in one set of 5 keys of the third row of the standard keyboard to the first secondary row of 5 keys of the alternate keyboard; and
f) assigning letters, characters or functions found in the other set of last 5 keys of the third row of the standard keyboard to the second secondary row of 5 keys of the alternate keyboard.

The preferred key allocation scheme is as follows
a) the first primary row of keys is assigned the letters "Q", "W", "E", "R" and "T" of the English alphabet;
b) the second primary row of keys is assigned the letters "A", "S", "D", "F" and "G" of the English alphabet;
c) the third primary row of keys is assigned the letters "Y", "U", "I", "O" and "P" of the English alphabet;
d) the fourth primary row of keys is assigned the letters "H", "J", "K" and "L" of the English alphabet and the character ";" or ":";
e) the first secondary row of keys is assigned the letters "Z", "X", "C", V" and "B" of the English alphabet; and
f) the second secondary row of keys is assigned the letters "N" and "M" of the English alphabet and the characters "," or "<", "." or ">" and "/" or "?".

Further features of the invention are described below.

BRIEF DESCRIPTION OF DRAWINGS

In drawings which illustrate various non-limiting embodiments of the invention.

DETAILED DESCRIPTION

Figure 1A:
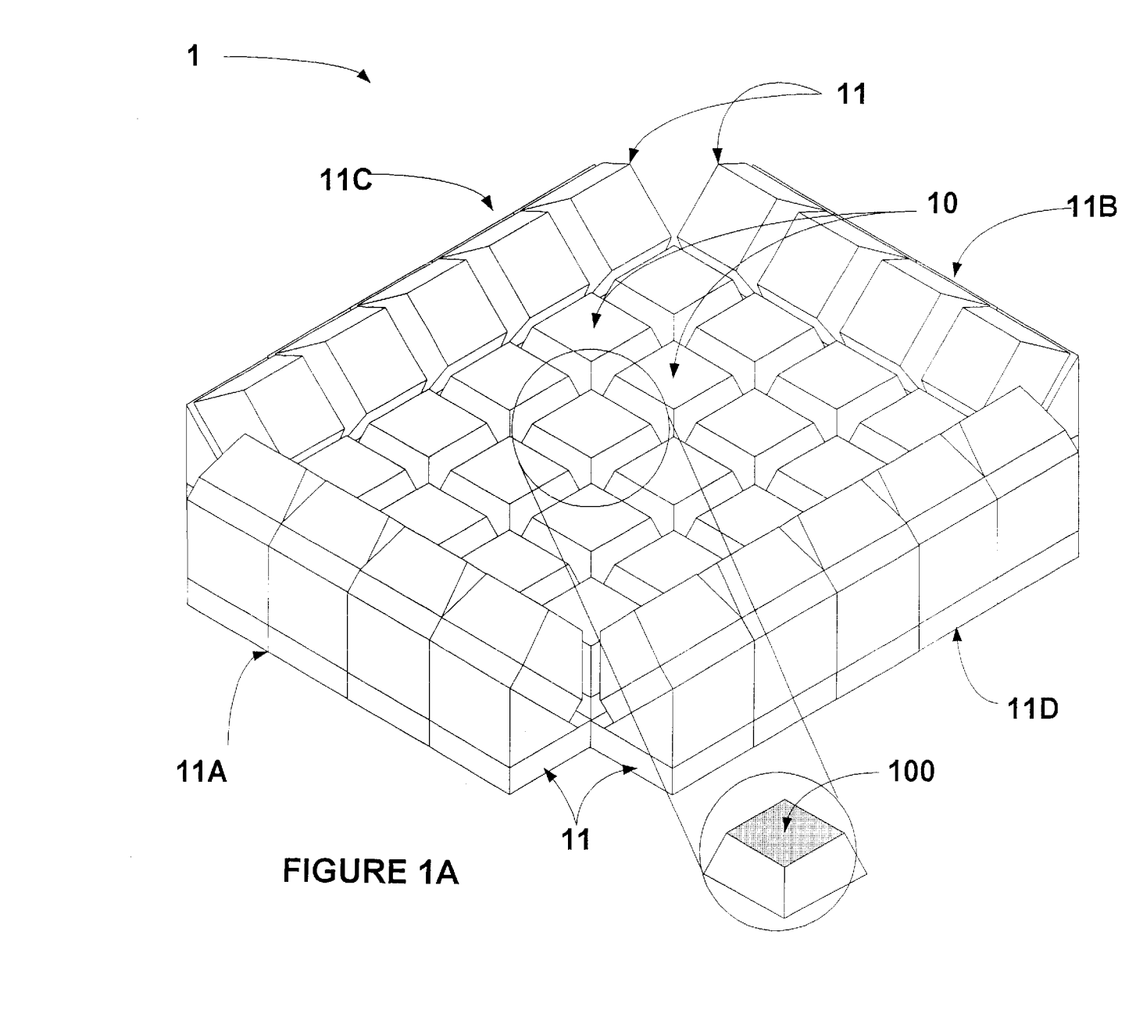
FIG. 1A is a perspective view of a keyboard according to a preferred embodiment of the invention.

This invention provides keyboards having keys arranged in a novel configuration. More specifically, this invention provides keyboards having keys arranged in a pan-like configuration. As shown in FIG. 1A, a keyboard 1 has a number of central keys 10. Upper faces of central keys 10 are arranged in a generally flat configuration. Inwardly angled peripheral keys 11 are positioned peripherally adjacent to and angled toward central keys 10. The surface of keyboard 1 thus has a shallow depression bounded by inwardly angled keys 11. This shallow depression can easily be located by feel. The presence of inwardly-angled keys 11 also provides tactile feedback to a user's hand, thereby facilitating the proper positioning of fingers on keyboard 1 without the need for visual cues. It should be noted that this invention does not require the whole outer periphery of central keys 10 to be occupied by inwardly angled keys 11.

In a one-hand operated keyboard 1, according to a preferred embodiment of the invention, central keys 10 are positioned in a quadrilateral array. In the specific embodiment shown in FIG. 1A, the array has 4 rows and 5 columns of central keys 10, all contained within a rectangular outer boundary. Each central key 10 has a contact surface 100 on its upper face which is contacted by a user's finger when the key is actuated. Contact surfaces 100 are generally co-planar, as is usual in standard keyboards.

Figure 1B:
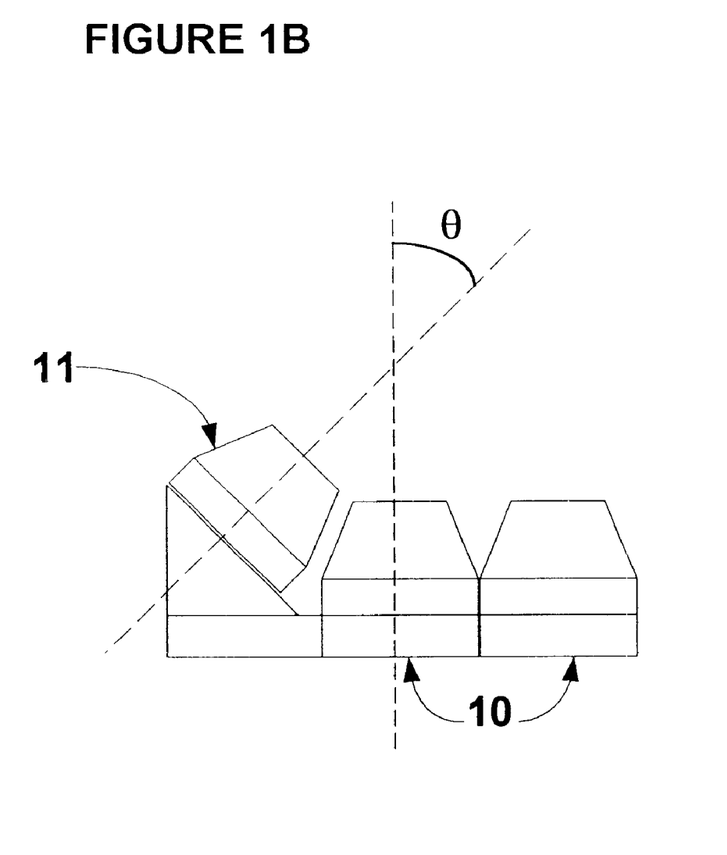
FIG. 1B is a partial side view of a keyboard according to a preferred embodiment of the invention.

Preferably, inwardly-angled keys 11 are positioned side-by-side around the array of central keys 10, thereby creating a rectangular string of inwardly-angled keys 11 i.e. a left column 11A of keys adjacent to the left boundary of central keys 10, a right column 11B of keys adjacent to the right boundary of central keys 10, a top row 11C of keys adjacent to the top boundary of central keys 10 and a bottom row 11D of keys adjacent to the bottom boundary of central keys 10. As shown in FIG. 1B, the contact surface of each inwardly-angled key 11 is angled at an angle θ, which is preferably approximately 45° toward the adjacent portion of the outer boundary of central keys 10. θ is preferably in the range of about 10° to about 90° and is most preferably in the range of about 40° to about 50°. Inwardly angled keys 11 minimize finger reach during operation. A user can rest a hand with its fingers in the depression formed by inwardly-angled keys 11. The user can actuate any of the inwardly-angled keys 11 with relatively little finger movement.

Figure 1C:
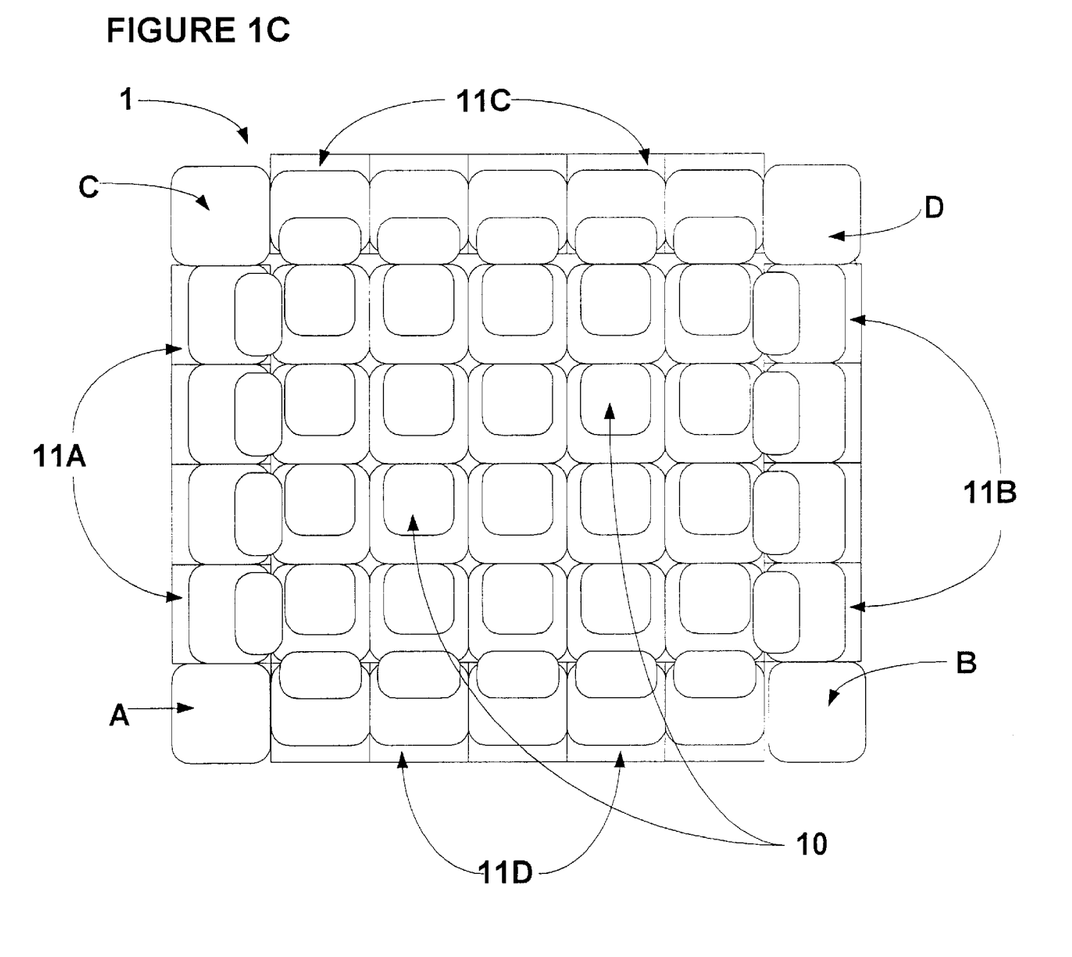
FIG. 1C is a top view of a keyboard according to a preferred embodiment of the invention.

A shown in FIG. 1C, because of geometrical restrictions in the preferred embodiment, no inwardly-angled keys 11 are located in positions A, B, C and D at the corners of the rectangle created by the string of inwardly-angled keys 11.

Figure 1D:
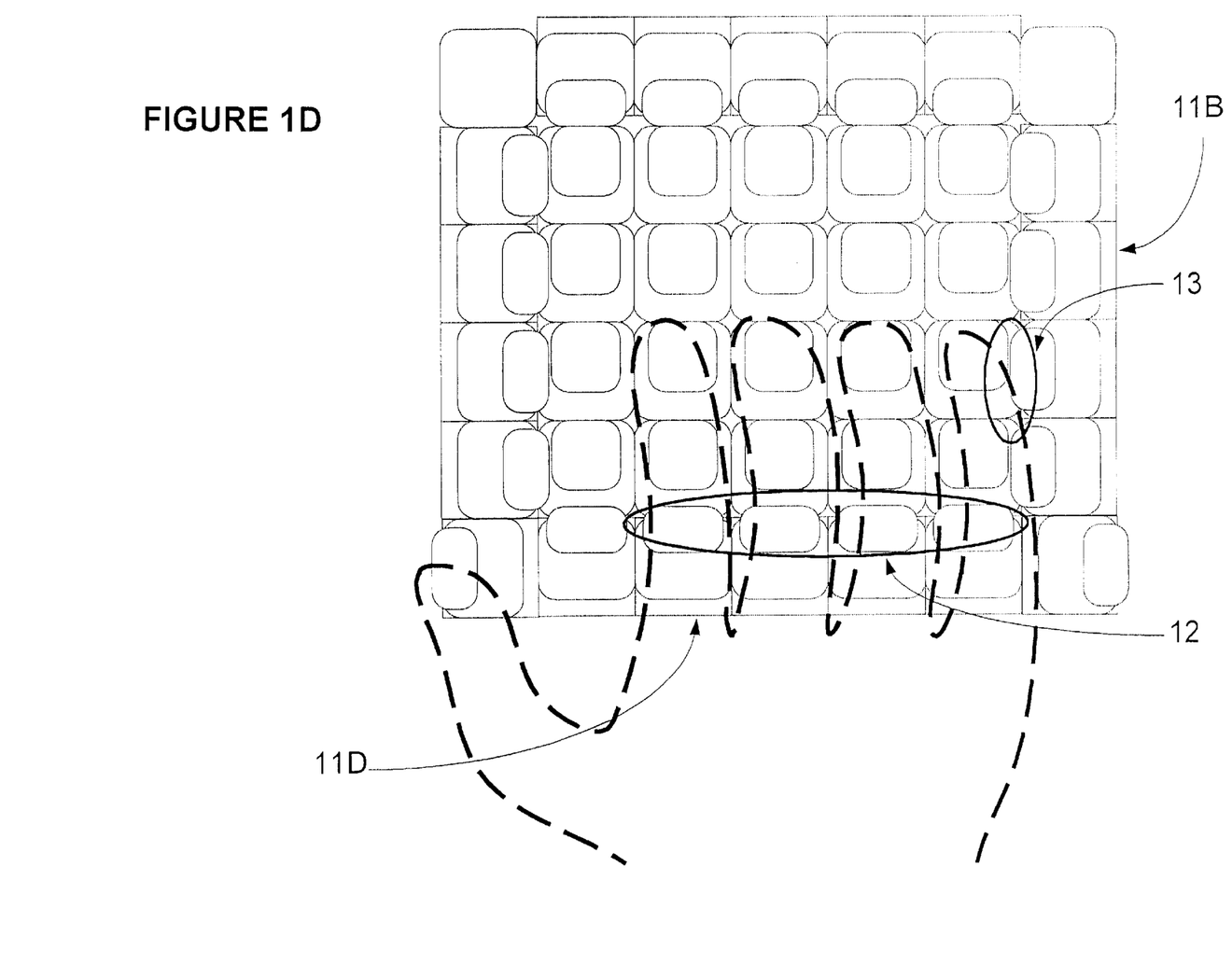
FIG. 1D is a top view of a keyboard according to a preferred embodiment of the invention, with an outline of a typical user's right hand.

The pan configuration of keyboard 1 facilitates the proper positioning of a user's hand as the user can readily locate central keys 10 by feel. For example, as shown in FIG. 1D, a user can readily locate his or her hand (right hand in FIG. 4) by feeling for a top edge of row 11D of inwardly-angled keys 11, which the user can allow to brush against the middle joint region of his or her fingers (with the approximate point of contact occurring around region 12). The user can also feel for a top of edge of column 11B (11A if left hand was used) of inwardly-angled keys 11, which the user can allow to brush against the side of his or her little finger (with the approximate point of contact occurring around region 13). Consequently, the raised features of inwardly-angled keys 11 help in locating the user's hand from side to side, as well as up and down, relative to the array of central keys 10.

Figure 2:
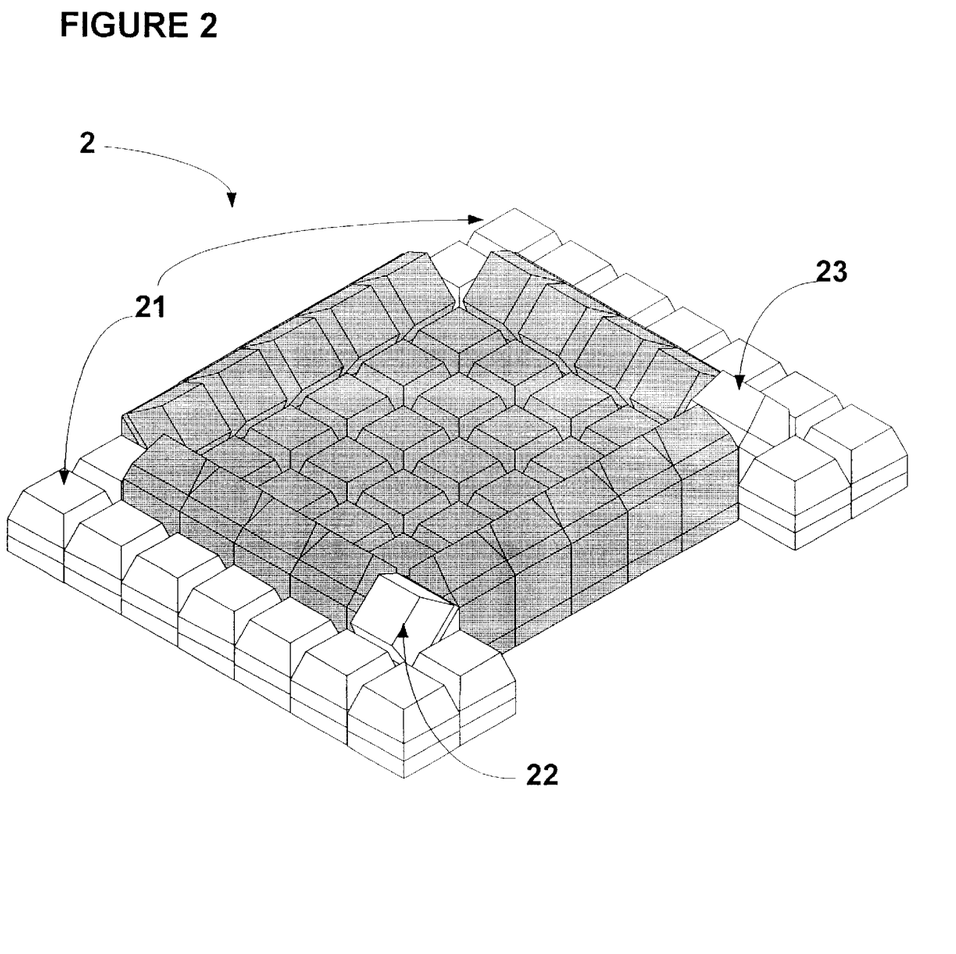
FIG. 2 is a further perspective view of a keyboard according to a preferred embodiment of the invention.

As shown in FIG. 2, specific embodiments of the invention may have additional keys positioned around pan-shaped keyboard 1 (keyboard 1 being outlined in a darker shade in FIG. 2). As outlined above, because of geometrical restrictions, no inwardly-angled keys 11 are located at corner positions A, B, C and D in the rectangle created by the string of inwardly-angled keys 11. As a result, outwardly angled keys 22 and 23 can be positioned at bottom corner positions A and B respectively. Outwardly angled keys 22 and 23 are angled away from bottom row 11D of inwardly-angled keys 11. In these locations, they can be easily operated by a user's thumb and either a user's little finger or the side of a user's hand. For example, when keyboard 2 is being operated by a left hand, right outwardly angled key 23 is located where it can be operated by a user's thumb, while left outwardly angled key 22 is located where it can be operated either by a user's little finger or by the side of the user's left hand. Outwardly angled keys 22 and 23 are preferably angled at an angle of approximately 45° to the horizontal plane and face away from bottom row 11D of inwardly-angled keys 11 i.e. in an opposite direction to the angle direction of the relevant column of inwardly-angled keys 11 as shown in FIG. 2.

In relation to a key over which a user's left middle finger naturally rests (the "Middle Finger Home Key"), any key positioned radially outward in the Southeastern quadrant (North being approximately the direction toward which the middle and ring fingers naturally point when at rest) at a distance between 2" and 4" is typically easily accessible by a user's left thumb and any key positioned radially outward in the Southwestern quadrant at a distance between 2" and 4" is typically easily accessible by a user's left little finger (or side of hand if the key is raised and, preferably, angled). Conversely, in relation to the Middle Finger Home Key, any key positioned radially outward in the Southwestern quadrant (North being approximately the direction toward which the middle and ring fingers naturally point when at rest) at a distance between 2" and 4" is typically easily accessible by a user's right thumb and any key positioned radially outward in the Southeastern quadrant at a distance between 2" and 4" is typically easily accessible by a user's right little finger (or side of hand if the key is raised and, preferably, angled).

With respect to a one-handed keyboard where the Middle Finger Home Key is the same key for either hand, as is the case with respect to keyboard 1 (i.e. key located in the middle column of central keys 10), a key positioned radially outward in the Southeastern or Southwestern quadrant at a distance between 2" and 4" from said key, would typically be easily accessible by a thumb, little finger (or side of hand if the key is raised and, preferably, angled), irrespective of which hand operates the one-handed keyboard. With keyboard 1 comprising central keys 10 positioned linearly side by side in a pattern of adjacent rows and columns, these dimensions typically translate themselves into the following keys being easily accessible:

LH Thumb: can typically easily access a key located 2–3 rows South of row where the Middle Finger Home Key is located and 3–4 rows East of column where the Middle Finger Home Key is located ;

LH Little Finger/:Side of Hand can typically easily access a key located 2–3 rows South of row where the Middle Finger Home Key is located and 3–4 rows West of column where the Middle Finger Home Key is located (side of hand can access the key if it is raised and, preferably, angled);

RH Thumb: can typically easily access a key located 2–3 rows South of row where the Middle Finger Home Key is located and 3–4 rows West of column where the Middle Finger Home Key is located;

RH Little Finger/:Side of Hand can typically easily access a key located 2–3 rows South of row where the Middle Finger Home Key is located and 3–4 rows East of column where the Middle Finger Home Key is located (side of hand can access the key if it is raised and, preferably, angled).

With the above criteria in mind, outwardly angled keys 22 and 23 are positioned, in the preferred embodiment, at the intersection of bottom row 11D with columns 11A and 11B (i.e. at the extremities of bottom row 11D), with a third row 10C of central keys 10 being assigned as the "home row" (i.e. the row of keys where a user's fingers naturally rest), with the Middle Finger Home Key being the middle key of the home row.

Outside keys 21, which are preferably not angled with respect to central keys 10, may be located at top corner positions C and D in the rectangle created by the string of inwardly-angled keys 11. Furthermore, the embodiment of the invention shown in FIG. 2 (keyboard 2) comprises a plurality of outside keys 21 positioned side-by-side in a generally planar configuration around inwardly-angled keys 11. In the preferred configuration shown in FIG. 2, outside keys 21 are positioned around each column (11A and 11B) of inwardly-angled keys 11.

Figure 3A:
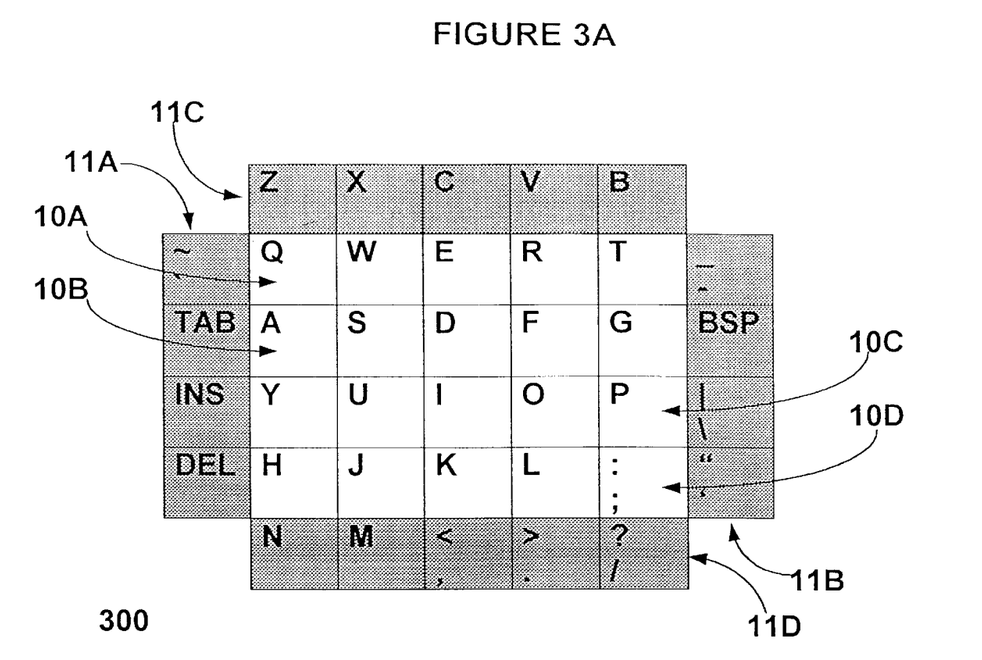
FIG. 3A is a schematic view of the keyboard, showing a preferred character/key allocation.

This invention also provides a novel character/key allocation scheme (i.e. assignment of characters and/or functions to particular keys of keyboard 1). As outlined above, in the preferred embodiment, a third row 10C of central keys 10 is assigned as the "home row". FIG. 3A shows the preferred character/key allocation scheme 300. In scheme 300, central keys 10 are assigned the characters which are found in the first two rows of characters of the standard Qwerty keyboard. The top two rows 10A and 10B of central keys 10 coincide with the first five characters of the first two rows of the standard Qwerty keyboard (i.e. Q-W-E-R-T and A-S-D-F-G). The bottom two rows 10C and 10D of central keys 10 coincide with the remaining five characters of the first two rows of the standard Qwerty keyboard (i.e. Y-U-I-O-P and H-J-K-L-";" or ":"). A "Shift" function key 401 activates either the capital version of each letter or an alternate character as indicated (e.g. ":" instead of ";").

Consequently, 4 rows of 5 central keys 10 provide access to all of the characteristics of the top two rows of character keys in a standard keyboard. Home row 10C of central keys 10 is located immediately below row 10B, which includes keys to which are assigned the letters A-S-D-F-G, and immediately above row 10D, which includes keys to which are assigned the letters H-J-K-L-";" or ":". Letters A-S-D-F correspond to the letters where a two-handed user on a standard Qwerty keyboard rests the fingers of his or her left hand (i.e. home keys for a left hand). Letters J-K-L correspond to the letters where a two-handed user on a standard Qwerty keyboard rests the fingers of his or her right hand (i.e. home keys for a right hand). In this respect, this modified Qwerty key allocation will be intuitive to any user familiar with the standard Qwerty keyboard.

The last row of characters of the standard Qwerty keyboard (i.e. Z-X-C-V-B and -M-"," or "<"-"." or ">"-"/" or "?") are distributed among the 2 rows (11C and 11D) of inwardly-angled keys 11. The first five characters (Z-X-C-V-B) are located on top row 11C of inwardly-angled keys 11 and the next five characters (N-M-"," or "<"-"." or ">"- "/" or "?") are located on bottom row 11D of inwardly-angled keys 11. The 2 columns (11A and 11B) of inwardly-angled keys 11 are associated with oft-used functions such as Tab ("TAB"), Insert ("INS"), Delete ("DEL") and Back Space ("BSP"), as well as oft-used non-numeric characters, as shown in FIG. 3A. Again, "Shift" function key 401 activates either the capital version of each letter or an alternate character as indicated (e.g. "?" instead of "/").

Figure 3B:
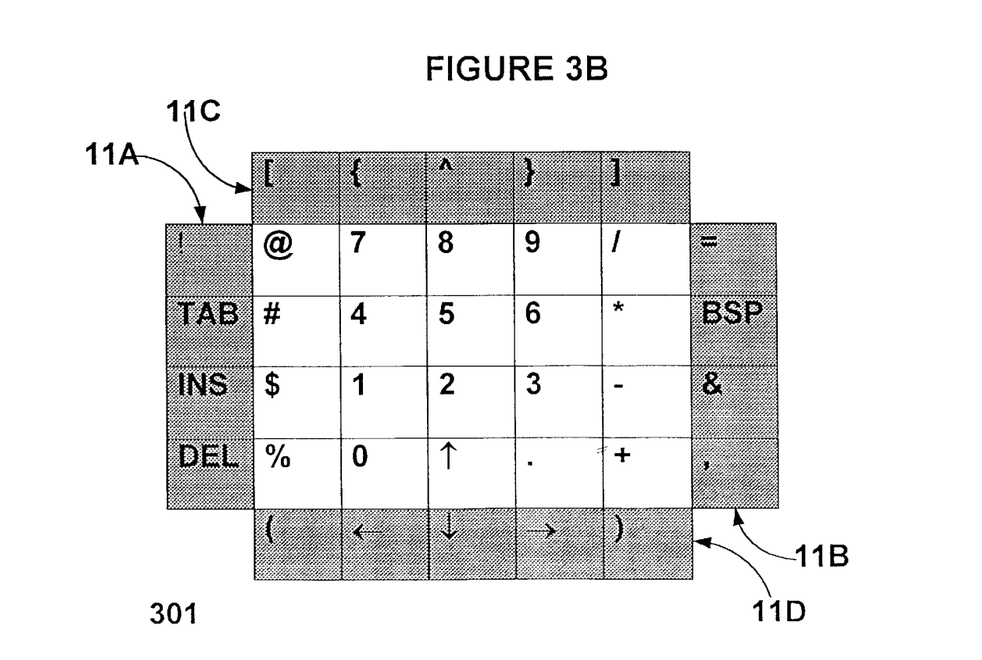
FIG. 3B is a schematic view of the keyboard, showing an alternative character/key allocation.

Alternative character/key allocation scheme 301, shown in FIG. 3B, is active when keyboard 1 is in a "numeric mode". The numeric mode is activated by a "NUM" key 402. In this scheme, central keys 10 comprise the standard numerical characters arranged in the usual numerical scheme (i.e. "7", "8" and "9" in the top row, "4", "5" and "6" in the second row, "1", "2" and "3" in the third/home row, "0" in the fourth row,), located in the middle three columns of central keys 10. Characters representing standard mathematical functions ("/", "*", "-" and "+") are located in the fifth column of central keys 10, with four standard characters usually associated with numerical characters in the standard Qwerty keyboard ("@", "#", "$" and "%") located in the first column of central keys 10. The remaining characters usually associated with numerical characters in the standard Qwerty keyboard ("!", "^", "&", "(" and ")"), as well as other characters used in the standard Qwerty keyboard ("[", "]", "{", "}", "=" and ",") are assigned to keys distributed among the 2 columns (11A and 11B) and 2 rows (11C and 11D) of inwardly-angled keys 11 as shown in FIG. 3B. Finally, function keys "←" (left arrow), "↓" (down arrow) and "→" (right arrow) are located in the middle three keys of bottom row 11D of inwardly-angled keys 11, with function key "↑" (up arrow) located in the centre of the bottom row of central keys 10 to form an intuitive arrangement of these keys. Numerical allocation scheme 301 may comprise further character and function keys as shown in FIG. 3B.

Figure 3C:
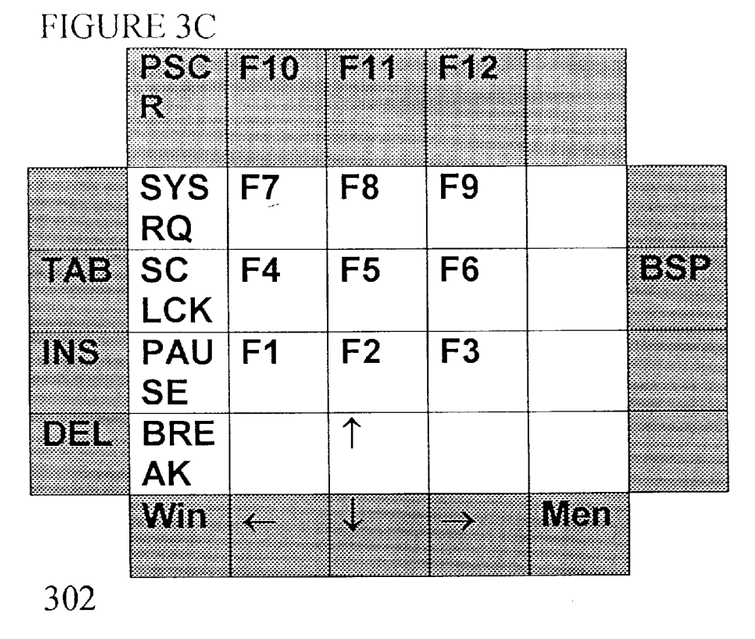
FIG. 3C is a schematic view of the keyboard, showing a further alternative character/key allocation.
Figure 3D:
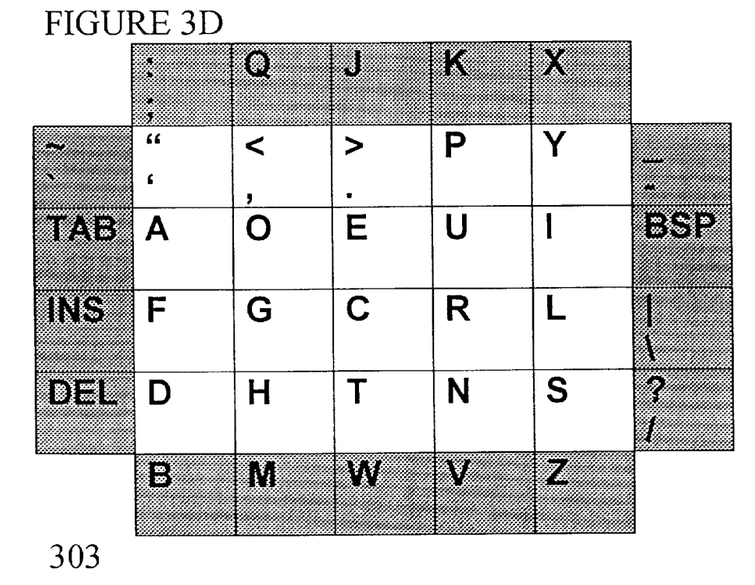
FIG. 3D is a schematic view of the keyboard, showing a further alternative character/key allocation.

Alternative character/key allocation scheme 302, shown in FIG. 3C, is active when keyboard 1 is in a "personal computer" or "PC" mode. The personal computer mode is activated by a "PC" key 403. PC scheme 302 comprises standard function keys ("F1" to "F12"), as well as the following oft-used function keys:

Print Screen ("PSCR");

System Requirement ("SYSRQ");

Scroll Lock ("SC LCK");

Pause ("PAUSE");

Break ("BREAK");

Windows Function ("WIN"); and

Menu ("MEN").

PC scheme 302 preferably comprises further character and function keys as shown in FIG. 3C.

Contrary to when scheme 300 is active, when numerical mode 301 or personal computer mode 302 is active, "Shift" function key 401 does not need to activate alternate characters or functions.

All of the schemes outlined in FIGS. 3A to 3C can be associated with a single keyboard 1 by the use of function keys or software or electronic controls which switch between modes in which characters and/or functions are assigned to each key according to each one of these schemes. For example, when Numerical function ("NUM") is activated, keyboard 1 is in a mode in which characters and/or functions are assigned to each key according to numerical scheme 301; when Personal function ("PC") is activated, keyboard 1 is in a mode in which characters and/or functions are assigned to each key according to PC scheme 302. Indicators 400, which may be LEDs for example, indicate whether numerical scheme 301 or PC scheme 302 is currently active. Scheme 300 is the default character/key allocation i.e. the arrangement which is in use when neither numerical scheme 301 nor PC scheme 302 is active. LED indicators 400 may be provided to indicate whether the "Scroll Lock" and/or "Caps Lock" and/or "Num Lock" and/or "PC Lock" functions are engaged. In the preferred embodiment, the "Shift" function can be locked on by quickly pressing "Shift" function key 401 twice. This locking function is provided by a "Caps Lock" key on conventional keyboards. The "Num" function can be locked on by quickly pressing "Num" function key 402 twice. This locking function is provided by a "Num Lock" key on conventional keyboards. The "PC" function can be locked on by quickly pressing "PC" function key 403 twice.

Figure 4:
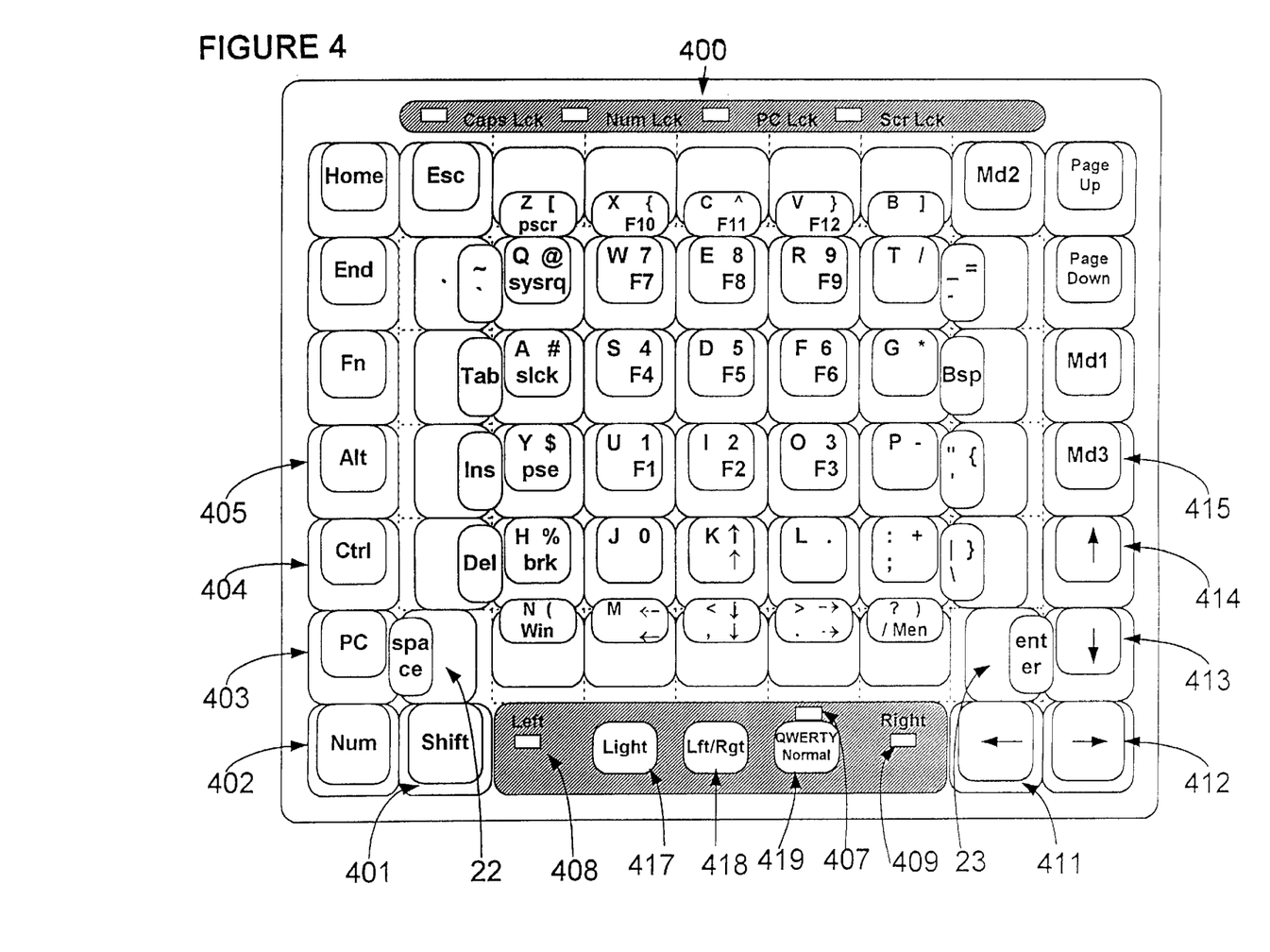
FIG. 4 is a top schematic view of the keyboard according to a preferred embodiment of the invention.

FIG. 4 is a diagram of keyboard 2, substantially as shown in FIG. 2, in which the keys bear indicia representing the characters and/or functions associated with the keys in each of schemes 300, 301 and 302, is shown at FIGS. 3A to 3C. Central keys 10 are labeled as follows:

| Corner of central key 10 | Characters |
| --- | --- |
| Top left | Scheme 300 characters/functions activated by "Shift" key |
| Bottom left | Scheme 300 characters/functions |
| Top right | Scheme 301 characters/functions |
| Bottom right | Scheme 302 characters/functions |

As indicated above, "Shift" key 401 activates alternate characters only when scheme 300 is active. With respect to scheme 300, similarly to the labeling found on prior art keyboards, when the alternate character activated by "Shift" key 401 is a capital version of a character, the capital version is represented in the top left corner of the relevant central key 10, with the bottom left corner of the key being left blank. On the other hand, a blank being left in either the top right or bottom right corner of a central key 10 indicates that no character or function has been allocated to that key in numerical scheme 301 (if top right is left blank) and/or in personal computer scheme 302 (if bottom right is left blank).

FIG. 4 also shows a novel character/key allocation arrangement with respect to outwardly angled keys 22 and 23. If a user is to utilize his or her right hand ("right hand use"), left outwardly angled key 22 is associated with the "Space" function and right outwardly angled key 23 is associated with the "Enter" function; in this respect, the "Space" function is selected by a user's thumb, while the "Enter" function is selected by a user's little finger or, more importantly, by the side of a user's hand. Conversely, if a user is to utilize his or her left hand ("left hand use"), right outwardly angled key 23 is associated with the "Space" function and left outwardly angled key 22 is associated with the "Enter" function; as a result, again, the "Space" function is selected by a user's thumb and the "Enter" function is selected either by a user's little finger or, more importantly, by the side of a user's hand. A Left/ Right key 418 is associated with an outside key 21 which, in the preferred embodiment, is located below bottom row 11D of inwardly-angled keys 11. By pressing "Lft/Rgt" key 418, a user can cause keyboard 1 to toggle between the "right hand use" mode and the "left hand use" mode as outlined above. Thus, a single keyboard can be comfortably used by both left and right-handed users. LED indicators 408 and 409, also located below bottom row 11D of inwardly-angled keys 11, indicate which mode ("left hand use" or "right hand use") is in effect. The ability to conveniently activate outwardly angled keys 22 and/or 23 with the side of a user's hand is a useful feature of keyboard 1.

Outside keys 21 may be associated with lesser used functions. For example, FIG. 4 shows the functions associated with outside keys 21 in a preferred embodiment of the invention:

Escape ("Esc");
Home ("Home");
End ("End");
Function ("Fn");
Page Up ("Page Up");
Page Down ("Page Down");
Manufacturer Definable Keys ("Md1" and "Md2").

Furthermore, outside keys 21 comprise keys 401 to 405 and 411 to 415, distributed in the form of an "L" around the bottom ends of the columns (11A and 11B) of inwardly-angled keys 11. FIG. 4 shows the functions associated with keys 401–405 and 411–415 when keyboard 2 is in "right hand use" mode (i.e. indicator 409 is lit up):

| | |
| --- | --- |
| key 401: "Shift" | key 411: "←" (left arrow), |
| key 402: "NUM" | key 412: "→" (right arrow), |
| key 403: "PC" | key 413: "↓" (down arrow), |
| key 404: "Ctrl" | key 414: "↑" (up arrow), |
| key 405: "Alt" | key 415: Manufacturer Definable ("Md3"). |

As outlined above, when keyboard 2 is in "right hand use" mode, left outwardly angled key 22 is associated with "Space" and right outwardly angled key 23 being associated with "Enter".

Conversely, if keyboard 2 is in "left hand use" mode (i.e. indicator 408 is lit up), the reverse key allocation applies:

| | |
| --- | --- |
| key 411: "Shift" | key 401: "←" (left arrow), |
| key 412: "NUM" | key 402: "→" (right arrow), |
| key 413: "PC" | key 403: "↓" (down arrow), |
| key 414: "Ctrl" | key 404: "↑" (up arrow), |
| key 415: "Alt" | key 405: Manufacturer Definable ("Md3"). |

As outlined above, when keyboard 2 is in "left hand use" mode, left outwardly angled key 22 is associated with "Enter" and right outwardly angled key 23 is associated with "Space".

Figure 5:
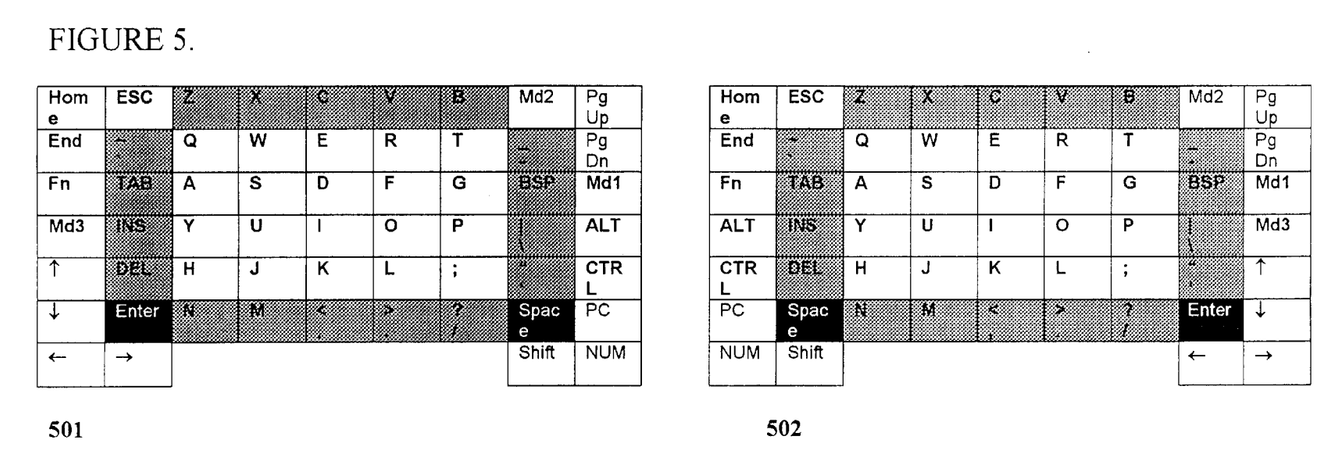
FIG. 5 is a schematic view of two keyboards operating as a single logical input device, showing a preferred character/key allocation.

In the currently preferred embodiment of this invention, each keyboard comprises suitable electronic circuitry and connectors (inlets, outlets etc . . . ) so that it can be connected, in parallel or in series with one or more similar keyboards, to a host computer, or other electronic apparatus, and operate in such a manner that, to the user, the keyboards are effectively a single input device i.e. where any key that is typed on any keyboard transmits the relevant signal to the host computer. For example, two single handed keyboards 2, each comprising character/key allocation schemes 300, 301 and 302 as shown in FIG. 4, can be used simultaneously. FIG. 5 shows a preferred embodiment of this example when scheme 300 has been activated in both keyboards: left keyboard 501 is in "left hand use" mode and right keyboard 502 is in "right hand use mode". A user could also place one of the keyboards in the numeric or personal computer mode so as to have one keyboard configured to permit entry of text and the other configured to facilitate entry of numbers or computer functions.

Figure 6:
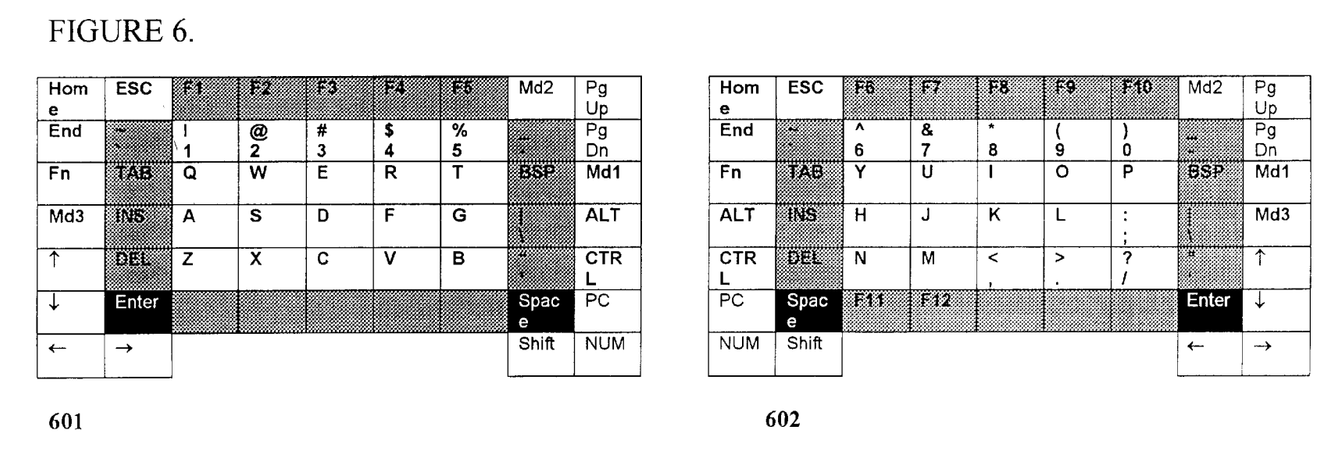
FIG. 6 is a schematic view of two keyboards operating as a single input device, showing an alternative character/key allocation.

Connecting two single handed keyboards as outlined above allows for a different character/key allocation arrangement. Because of the availability of two keyboards, it is possible to have an arrangement which simply provides the key layout of a standard two-hand Qwerty keyboard divided into two one-hand keyboards as shown in FIG. 6 (i.e. a left Qwerty keyboard 601 and a right Qwerty keyboard 602). This alternative character/key allocation is called the (left hand or right hand) Qwerty mode. In the left hand Qwerty mode, functions and characters are assigned to keys in the same manner as the left-handed half of a Qwerty keyboard. In the right hand Qwerty mode, functions and characters are assigned to keys in the same manner as the right-handed half of a Qwerty keyboard.

In the preferred embodiment shown at FIG. 4, a user can cause keyboard 2 to toggle between the keyboard's "Normal" allocation arrangements, which comprises character/key allocation schemes 300, 301 and 302, and the Qwerty mode, by pressing a "Qwerty/Normal" key 419. LED indicator 407, located below bottom row 11D of inwardly-angled keys 11, in the preferred embodiment located above "Qwerty/Normal" key 419, indicates if the Qwerty mode is in effect.

When the Qwerty mode is active (which will be shown by LED indicator 407), "left hand use" mode will result in keyboard 2 being in the left hand Qwerty mode (see left Qwerty keyboard 601 in FIG. 6) and "right hand use" mode will result in keyboard 2 being in the right hand Qwerty mode (see right Qwerty keyboard 602 in FIG. 6). A user can cause keyboard 2 to toggle between the left hand Qwerty mode and the right hand Qwerty mode by pressing Left/Right key 418. As shown in FIG. 6, it should be noted that "left hand use" mode and "right hand use" mode still provide particular key allocations for keys 22, 23, 401 to 405 and 411 to 415 outlined previously.

The keys themselves may operate according to any suitable technology, now available or developed in the future, which can be operated by a user's fingers.

In the preferred embodiment shown in FIG. 4, a "Light" key 417 is positioned below bottom row 11D of inwardly-angled keys 11. When "Light" key 417 is depressed by a user, keys of keyboard 2 light up, thereby assisting a user in seeing the keys even if it is dark. As such, keyboard 2 is convenient for users, such as police officers, ambulance personnel and taxi drivers, who may need to operate keyboards inside dispatched motor vehicles.

Keyboards provided by this invention comprise suitable electronic circuitry, which permits the transmission of the relevant signal to a host computer when keys are operated by a user.

As will be apparent to those skilled in the art and in light of the foregoing disclosure, many alterations and modifications are possible in the practice of this invention without departing from the spirit or scope thereof.

Figure 7:
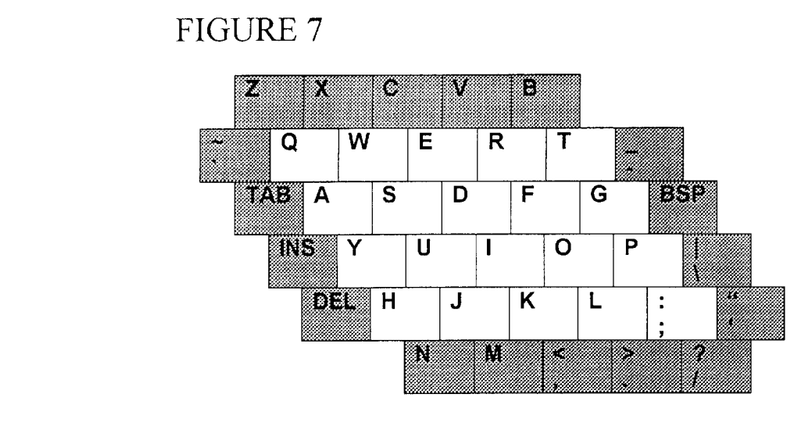
FIG. 7 is a schematic view of a keyboard according to an alternative embodiment of the invention; and, FIG. 8 is a schematic view of a keyboard according to a further alternative embodiment of the invention.

As outlined above, the novel configuration of keys aspect provided by this the invention resides in the pan-shape configuration of the keys, as embodied by keyboard 1. Many alternatives to the preferred embodiment are possible. For example, the number of arrangement of central keys 10 may depart from 4 rows of 5 central keys 10. Furthermore, there is no requirement that each row and each column of central keys 10 be perfectly aligned to create a rectangular outer boundary. As shown in FIG. 7, the rows of central keys 10 could be staggered to provide a parallelogram outer boundary. This is not preferred because it makes it more difficult to use the same keyboard for both left-hand and right-hand operation; however, it may be appropriate for users who intend on using such a keyboard exclusively with a particular hand. Also, central keys 10 could be distributed along curvilinear rows, with inwardly-angled keys 11 being distributed along the curvilinear boundary(ies). Also, although inwardly-angled keys 11 are angled at approximately forty five (45) degrees in the currently preferred embodiment of the invention, the inclination can depart from this angle, as long as access by a user's fingers is not unduly compromised.

Figure 8:
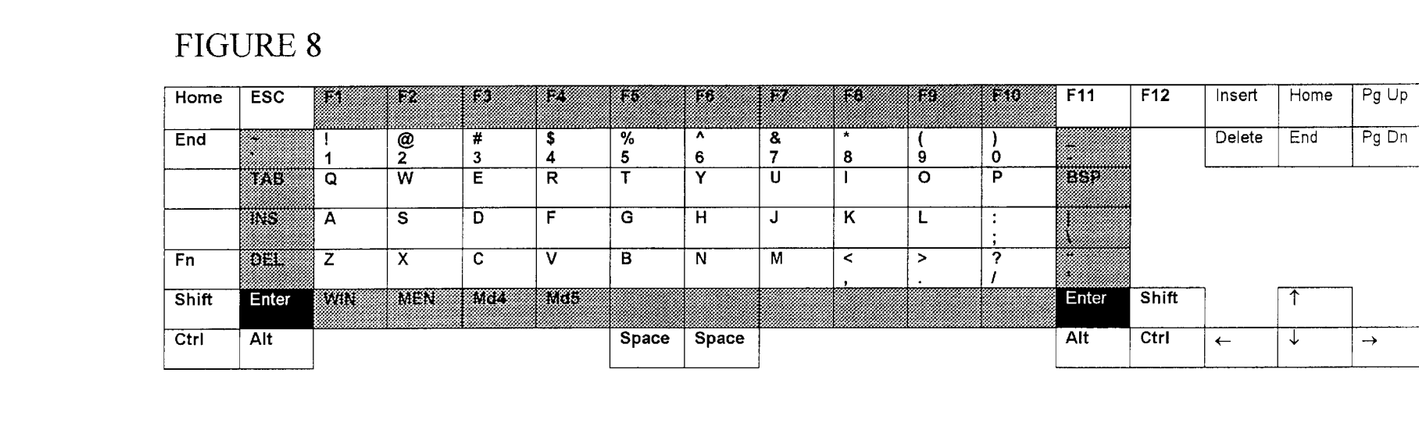

Although the currently preferred embodiment of this invention is adapted for one-hand operation, a two-hand keyboard can be provided according to this invention. FIG. 8 shows an alternative embodiment of the invention, adapted for two-handed operation. Keyboard 5 comprises 3 rows of 10 central keys 10, with single rows and columns of inwardly-angled keys 11 surrounding the outer boundary of central keys 10.

Also, although each row of central keys 10 includes the same number of central keys 10 in the preferred embodiment, this invention can provide rows of varying numbers of central keys 10. As a result, many key configurations, where inwardly-angled keys 11 are easily accessible by a user's fingers, are possible according to this invention.

As outlined above, a further aspect of the novel configuration of keys pursuant to the invention resides in the distribution of keys around inwardly-angled keys 11 and in the positioning of outwardly angled keys 22 and/or 23. Many alternatives to the preferred embodiment are possible. For example, rows of keys could be positioned below and above rows 11C and 11D of inwardly-angled keys 11. Also, more than single columns of keys could be positioned to the left and right of columns 11A and 11B of inwardly-angled keys 11.

As outlined above, this invention also provides a novel character/key allocation for pan-shaped keyboard 1 adapted for one-hand operation. The currently preferred embodiment is a modified keyboard which can be used in an intuitive manner by any user familiar with the standard Qwerty keyboard. An alternative character/key allocation is one where central keys 10 comprise the first two rows of characters of the standard Qwerty keyboard, but where the top two rows of central keys 10 coincide with the last five characters (i.e. Y-U-I-O-P and H-J-K-L-";" or ":") and the bottom two rows of central keys 10 coincide with the first five characters (i.e. Q-W-E-R-T and A-S-D-F-G). In this respect, home row 10C is located immediately below row 10B, which comprises keys to which are assigned the letters/characters H-J-K-L-";" or ":", the last three letters (J-K-L) corresponding to the letters where a two-handed user on a standard Qwerty keyboard naturally rests the fingers of his or her right hand (i.e. home keys of a right hand), and located immediately above row 10D, which comprises keys to which are assigned the letters A-S-D-F-G, the first four letters (A-S-D-F) corresponding to the letters where a two-handed user on a standard Qwerty keyboard rests the fingers of his or her left hand (i.e. home keys for a left hand). In this respect, this key allocation will again be intuitive to any user familiar with the standard Qwerty keyboard.

Another alternative embodiment of the invention provides a keyboard which implements a modified Dvorak key arrangement (shown in FIG. 3E). The same principle underlying scheme 300 applies i.e. central keys 10 comprise the first two rows of characters of a standard Dvorak keyboard, with the first two rows of central keys 10 coinciding with the first five characters of said rows of the standard Dvorak keyboard and the bottom two rows of central keys 10 coinciding with the remaining five characters of said rows of the standard Dvorak keyboard.

The scope of the invention is to be construed in accordance with the substance defined by the following claims.

What is claimed is:

1. A manually activated keyboard comprising:
   an array of central keys positioned in a generally planar configuration; and a plurality of inwardly-angled keys positioned peripherally adjacent to and angled toward the central keys; and, an array of outside keys positioned outside of the inwardly-angled keys in a generally planar configuration wherein the inwardly-angled keys are positioned in generally linear rows and columns.

2. A manually activated keyboard comprising:

an array of central keys positioned in a generally planar configuration; and a plurality of inwardly-angled keys positioned peripherally adjacent to and angled toward the central keys; and an outwardly angled key located in a position accessible by a user's thumb, little finger or side of a user's hand, the outwardly angled key angled away from the central keys.

3. A keyboard, as recited in claim 2, wherein the outwardly angled key is positioned radially outward a distance between 2 inches and 4 inches from a middle finger home key; and the middle finger home key is one of the array of central keys on which a user's middle finger naturally rests while operating the keyboard.

4. A manually activated keyboard comprising:

an array of central keys positioned in a generally planar configuration;

a plurality of inwardly-angled keys positioned peripherally adjacent to and angled toward the central keys; and an outwardly angled key positioned peripherally adjacent to the central keys, the outwardly angled key angled away from the central keys.

5. A manually activated keyboard comprising:

an array of central keys positioned in a generally planar configuration;

a plurality of inwardly-angled keys positioned peripherally adjacent to and angled toward the central keys, the inwardly-angled keys positioned in generally linear rows and columns; and, an outwardly angled key positioned at an intersection of one of the rows of inwardly-angled keys with one of the columns of inwardly-angled keys, the outwardly angled key angled away from the central keys.

6. A manually activated keyboard comprising:

an array of central keys positioned in a generally planar configuration; and a plurality of inwardly-angled keys positioned peripherally adjacent to and angled toward the central keys; the keyboard for use with one hand, the keyboard comprising:

four rows and five columns of central keys, an inwardly-angled key positioned at each end of each row of central keys to form two columns of inwardly-angled keys; and, an inwardly-angled key positioned at each end of each column of central keys to form two rows of inwardly-angled keys.

7. A keyboard, as recited in claim 6, connected to another keyboard, as recited in claim 6, the two keyboards forming a single logical input device to an electronic apparatus.

8. A keyboard, as recited in claim 6, comprising an array of outside keys positioned in a generally planar configuration peripherally outside the inwardly-angled keys.

9. A keyboard, as recited in claim 6, comprising an outwardly angled key located in a position accessible by a thumb, little finger or side of a user's hand and angled away from the central keys, the outwardly angled key angled away from the central keys.

10. A keyboard, as recited in claim 9, wherein the outwardly angled key is positioned radially outward a distance between 2 inches and 4 inches from a middle finger home key; wherein the middle finger home key is the key where a users middle finger naturally rests while operating the keyboard.

11. A keyboard, as recited in claim 6, comprising an outwardly angled key positioned peripherally adjacent to the central keys, the outwardly angled key angled away from the central keys.

12. A keyboard, as recited in claim 6, comprising an outwardly angled key positioned at an intersection of one of the rows of inwardly-angled keys with one of the columns of inwardly-angled keys, the outwardly angled key angled away from the central keys.

13. A keyboard, as recited in claim 6, connected to another keyboard, as recited in claim 6, the two keyboards forming a single logical input device to an electronic apparatus.

14. A keyboard, as recited in claim 6, wherein:

(a) a first row of central keys is assigned the letters "Q", "W", "E", "R" and "T" of the English alphabet;

(b) a second row of central keys is assigned the letters "A", "S", "D", "F" and "G" of the English alphabet;

(c) a third row of central keys is assigned the letters "Y", "U", "I", "O" and "P" of the English alphabet; and (d) a fourth row of central keys is assigned the letters "H", "J", "K" and "L" of the English alphabet and the character ";" or ":".

15. A keyboard, as recited in claim 14, wherein:

(a) a top row of inwardly-angled keys is assigned the letters "Z", "X", "C", "V" and "B" of the English alphabet; and (b) a bottom row of inwardly-angled keys is assigned the letters "N" and "M" of the English alphabet and the characters "," or "<", "." or ">" and "/" or "?".

16. A keyboard, as recited in claim 15, wherein the columns of inwardly-angled keys are assigned characters or functions from a group consisting of:

(a) characters "''", "~", "-", "_", "\", "|", "'" and """; and (b) functions "Tab", "Insert", "Delete" and "Back Space".

17. A keyboard, as recited in claim 8, wherein the outside keys are assigned functions selected from a group consisting of "Home", "Esc", "End", "Alt", "Ctrl", "Page Up", "Page Down", left arrow, right arrow, down arrow, up arrow, "Shift", "Num", "PC" and "Md".

18. A keyboard, as recited in claim 8, comprising a toggling key, wherein engaging the toggling key causes the functions, assigned to the outside keys, to toggle between alternative character/key allocation schemes.

19. A keyboard, as recited in claim 11, wherein the outwardly angled key is assigned a function selected from the group consisting of "Space" and "Enter".

20. A first keyboard, as recited in claim 6, and connected to a second keyboard, as recited in claim 6, the two keyboards forming a single logical input device to an electronic apparatus, wherein:

(a) a first row of central keys of the first keyboard is assigned the characters "1" or "!", "2" or "@", "3" or "#", "4" or "$" and "5" or "%";

(b) a second row of central keys of the first keyboard is assigned the letters "Q", "W", "E", "R" and "T" of the English alphabet;

(c) a third row of central keys of the first keyboard is assigned the letters "A", "S", "D", "F" and "G" of the English alphabet;

(d) a fourth row of central keys of the first keyboard is assigned the letters "Z", "X", "C", "V" and "B'" of the English alphabet;

(e) a first row of central keys of the second keyboard is assigned the character "6" or "^", "7" or "&", "8" or "*", "9" or "(" and "0" or ")";

(f) a second row of central keys of the second keyboard is assigned the letters "Y", "U", "I", "O" and "P" on the English alphabet;

(g) a third row of central keys of the second keyboard is assigned the letters "H", "3", "K" and "L" of the English alphabet and the character ";" or ":";

(h) a fourth row of central keys of the second keyboard is assigned the letters "N" and "M" of the English alphabet and the characters "," or "<", "." or ">" and "/" or "?".

21. A keyboard wherein:

(a) a first primary row of keys is assigned the letters "Q", "W", "E", "R" and "T" of the English alphabet;

(b) a second primary row of keys is assigned the letters "A", "S", "D", "F" and "G" of the English alphabet;

(c) a third primary row of keys is assigned the letters "Y", "U", "I", "O" and "P" of the English alphabet; and, (d) a fourth primary row of keys is assigned the letters "H", "J", "K" and "L" and the English alphabet and the character ";" or ":";

wherein each of the first through fourth primary rows of keys extend alongside another one of the first through fourth primary rows of keys, and wherein the first through fourth primary rows of keys extend in a column perpendicular to the first through fourth primary rows of keys.

22. A keyboard, as recited in claim 21, wherein:

(a) a first secondary row of keys is assigned the letters "Z", "X", "C", "V" and "B" of the English alphabet; and (b) a second secondary row of keys is assigned the letters "N" and "M" of the English alphabet and the characters "," or "<", "." or ">" and "/" or "?".

23. A method for assigning letters, characters or functions found in a standard keyboard comprising 3 rows of 10 keys, to the keys of an alternate keyboard having 4 primary rows of 5 keys and 2 secondary rows of 5 keys, the method comprising:

(a) assigning letters, characters or functions found in one set of 5 keys of the first row of the standard keyboard to the first primary row of 5 keys of the alternate keyboard;

(b) assigning letters, characters or functions found in one set of 5 keys of the second row of the standard keyboard to the second primary row of 5 keys of the alternate keyboard;

(c) assigning letters, characters or functions found in the other set of 5 keys of the first row of the standard keyboard to the third primary row of 5 keys of the alternate keyboard;

(d) assigning letters, characters or functions found in the other set of 5 keys of the second row of the standard keyboard to the fourth primary row of 5 keys of the alternate keyboard;

(e) assigning letters, characters or functions found in one set of 5 keys of the third row of the standard keyboard to the first secondary row of 5 keys of the alternate keyboard; and (f) assigning letters, characters or functions found in the other set of last 5 keys of the third row of the standard keyboard to the second secondary row of 5 keys of the alternate keyboard, wherein the first and second primary rows of keys are positioned adjacent to one another; the third and fourth primary rows of keys are positioned adjacent to one another; and, one of the first and second primary rows of keys is positioned adjacent to one of the third and fourth primary rows of keys.

* * * * *